United States Patent [19]

Gurliacci

[11] Patent Number: 5,255,664
[45] Date of Patent: Oct. 26, 1993

[54] MOBILE COOKING APPARATUS

[76] Inventor: Dominick E. Gurliacci, 11 Cindy La., Weston, Conn. 06883

[21] Appl. No.: 966,524

[22] Filed: Oct. 26, 1992

[51] Int. Cl.5 ............................................. F24C 1/16
[52] U.S. Cl. .................................. 126/276; 126/25 R; 99/427; 99/446
[58] Field of Search ............... 126/276, 25 R; 99/427, 99/446

[56] References Cited

U.S. PATENT DOCUMENTS

| | | | |
|---|---|---|---|
| 3,696,803 | 10/1972 | Holloway, Jr. | 126/25 R X |
| 3,742,838 | 7/1973 | Luschen et al. | 126/25 R X |
| 3,991,739 | 11/1976 | Hoffman, Jr. | 126/268 |
| 4,470,343 | 9/1984 | Didier | 126/25 R X |

Primary Examiner—Larry Jones
Attorney, Agent, or Firm—Edward R. Hyde

[57] ABSTRACT

A portable food cooking apparatus in which there is a line of cooking stations and a parallel line of serving stations. These are separated by a suitable smoke baffel and a trough to receive cooked food items from the cooking stations.

4 Claims, 5 Drawing Sheets

MOBILE COOKING APPARATUS

BACKGROUND OF THE INVENTION

1. Field of the Invention

The present invention relates to a portable food cooking apparatus and more particularly to an apparatus constructed as a vehicle such as a trailer that may be moved from one location to another. The apparatus is especially designed for cooking and serving deep fried pizza.

It is conventional to have various types of food at picnics and organizational events and a particularly popular type of food at such events is deep fried pizza. This is generally provided by setting up appropriate fires, pots of oil and tables so that pizza may be cooked by deep fat frying and served. Such arrangements have been found to be inefficient and time consuming in setting up, operating and dismantling after the event. The present invention contemplates a trailer that is constructed as a mobile kitchen for such cooking and which can be moved from one location to another.

2. Description of the Prior Art

Cooking apparatus in the form of portable field kitchens are, of course, well known. For example, U.S. Pat. No. 3,991,739 discloses a portable field kitchen structure that has a series of deep fry cooking pans; U.S. Pat. No. 3,696,806 show portable or mobile cooking apparatus with deep fat friers and U.S. Pat. Nos. 296,284 and 1,550,638 show portable kitchens with various rows of cooking containers. Another example of this general type of apparatus is U.S. Pat. No. 4,350,140.

The above cited patents lack the advantages of the present design in that they do not provide a convenient arrangement for cooking deep fried pizza and permitting a convenient arrangement for passing the pizzas to the servers. In addition, the apparatus of the prior art, as disclosed in the above patents, fall to provide an arrangement whereby the oil can be drained from the individual pizzas as they are conveyed from the pizza cookers to the servers.

Accordingly, it is a primary object of the present invention to provide a mobile apparatus for cooking food which can be conveniently moved from one location to another and readily set up for cooking and serving.

Another object of the present invention is to provide an efficient cooking apparatus design for deep frying pizza and conveniently serving it.

A still further object of the present invention is to provide a mobile cooking apparatus for cooking and serving pizza in a manner that is safe and comfortable for the cookers and food servers.

SUMMARY OF THE INVENTION

The mobile unit of the present invention is an elongated structure forming a trailer that may be moved from one location to another by an automobile or truck. The apparatus has on one side a series of cooking stations each of which may include two stoves for heating pans of cooking oil and the individual stations are appropriately separated by baffles or separators which tend to prevent the heat and smoke from each station passing to the adjacent stations. Arranged longitudinally and on the opposite side of the trailer structure is a elongated table for the individual serving persons to receive the pizzas and apply desired condiments. Longitudinally arranged between the series of cooking stations on one side and the elongated table on the other, is a v-shaped trough adapted to receive the individual pizzas so that the cooking oil may be drained from them for a period of time prior to serving. Above the trough is a smoke baffle that serves to separate the pizza cooks from the servers in a manner that prevents the smoke from the cooking pans of oil to bother the cooks and cause discomfort.

The design further includes an additional cooking station for cooking the pizza sauce and washing station for cleaning. Further, the mobile unit includes appropriate jacks to stabilize the kitchen at the cooking location.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein which.

DESCRIPTION OF THE PREFERRED EMBODIMENT

Figure 1:
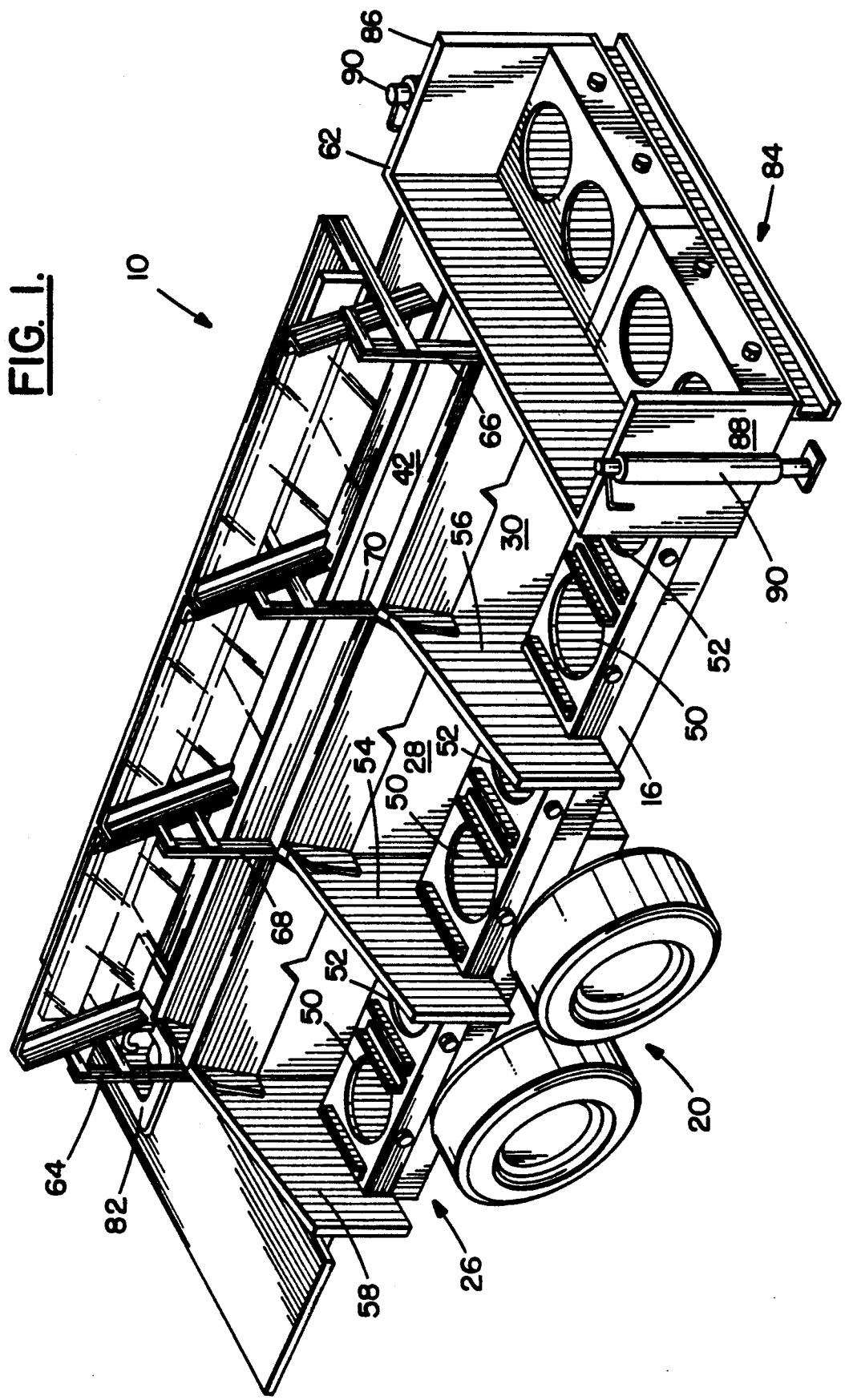
FIG. 1 is a perspective view of the mobile cooking apparatus from the forward end showing the line of cooking stations.
Figure 2:
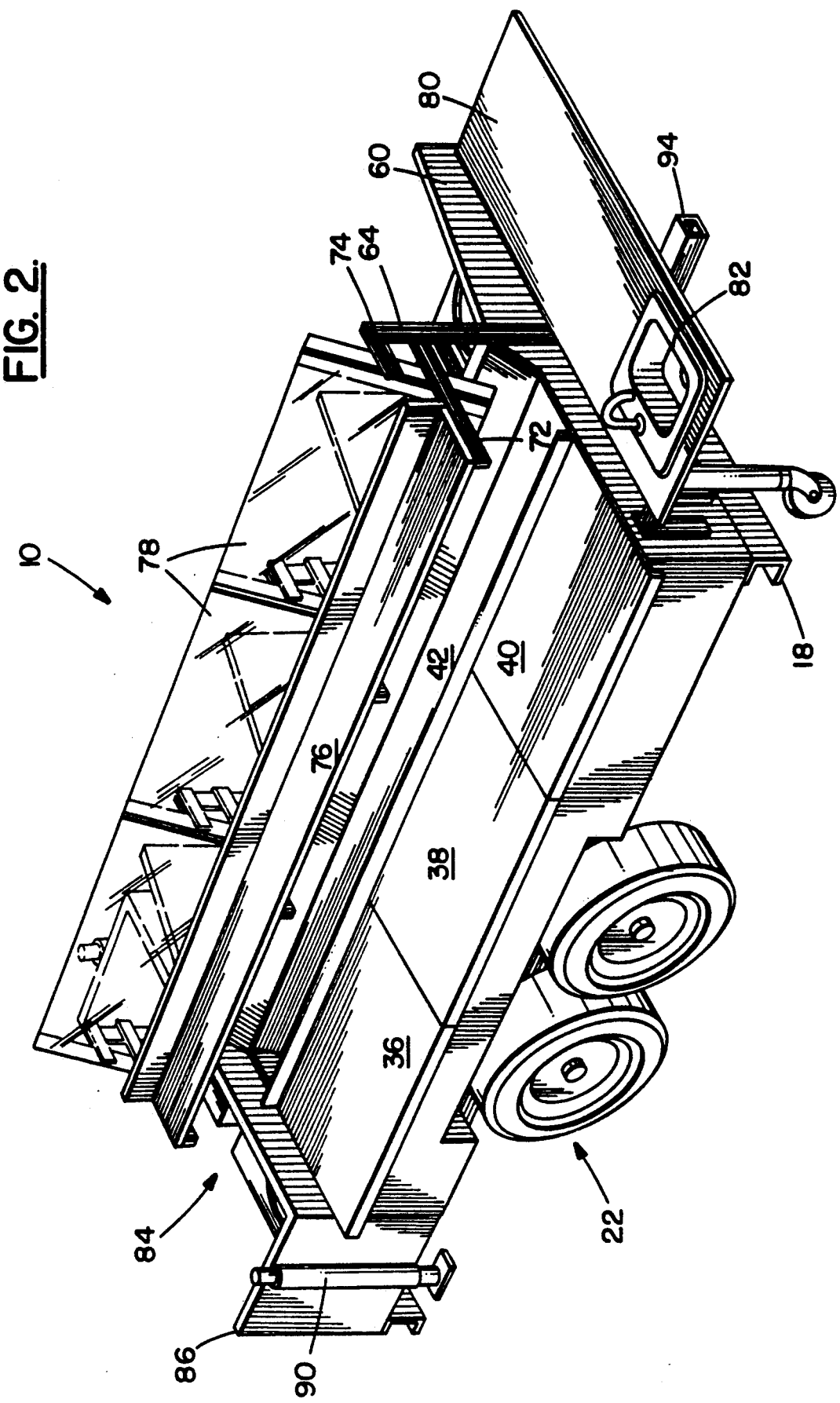
FIG. 2 is a perspective view from the rear end showing the serving table.
Figure 3:
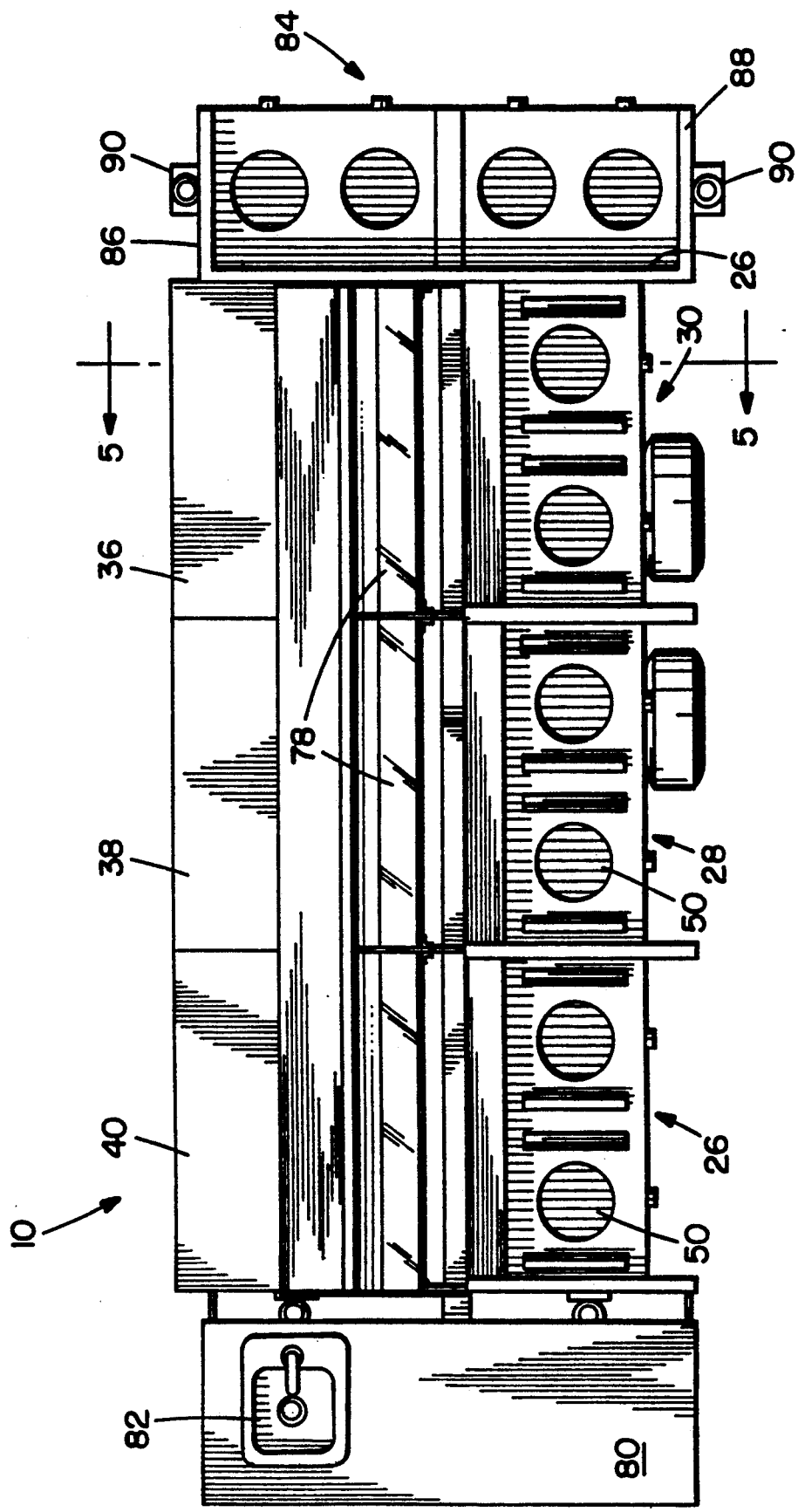
FIG. 3 is a plan view of the apparatus.
Figure 4:
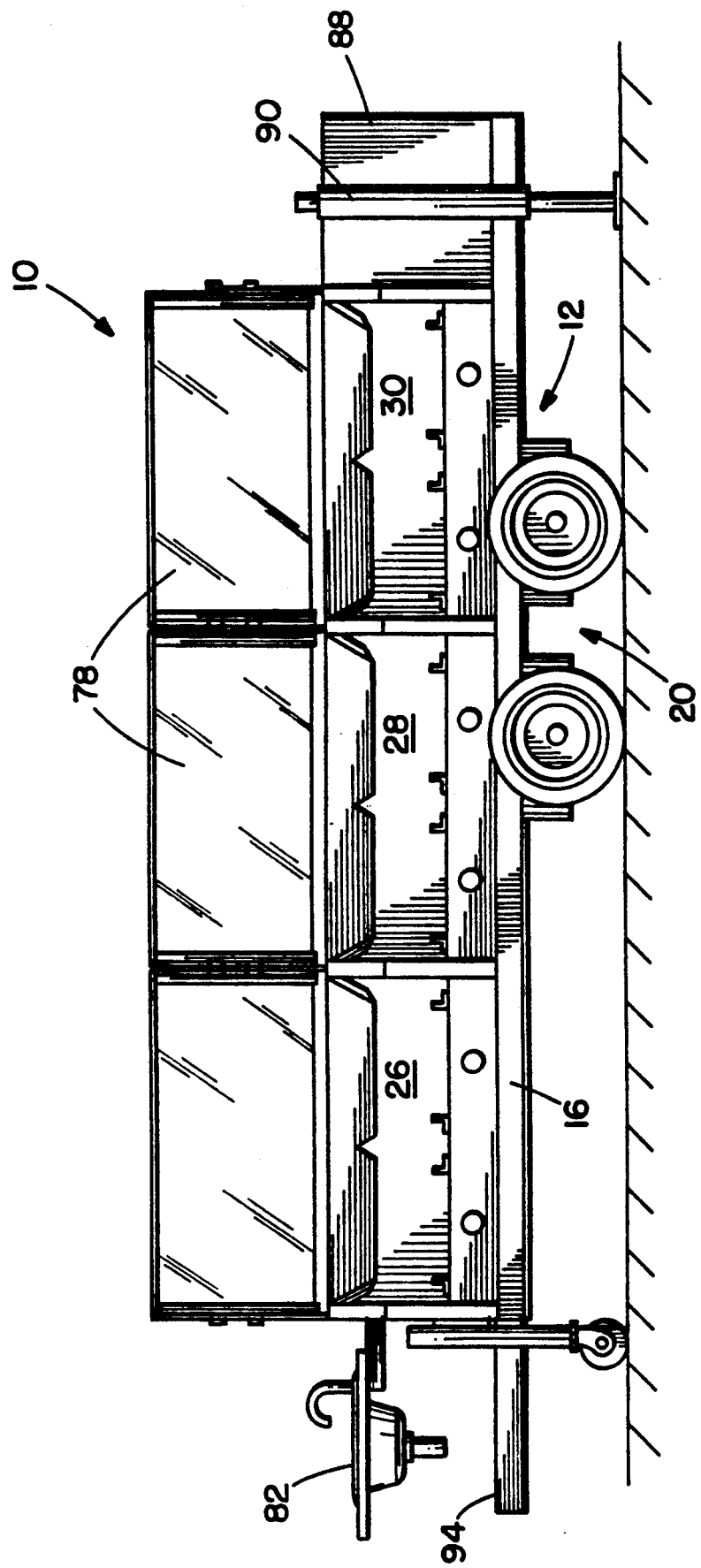
FIG. 4 is a side view of the left side.

Referring now to the drawings, numeral 10 indicates generally the portable cooking apparatus of the present invention in the form of a trailer. The apparatus is supported on a metal body framework 12 constructed of two longitudinally disposed beams 14, 16 and transverse beams such as 18. These beams may be of conventional cast iron construction as channel beams and serve to provide a strong and rigid framework for the apparatus. Wheel assemblies 20, 22 are secured to the underside of the framework and it has been found that dual wheels on each side serve to support the apparatus effectively.

Figure 5:
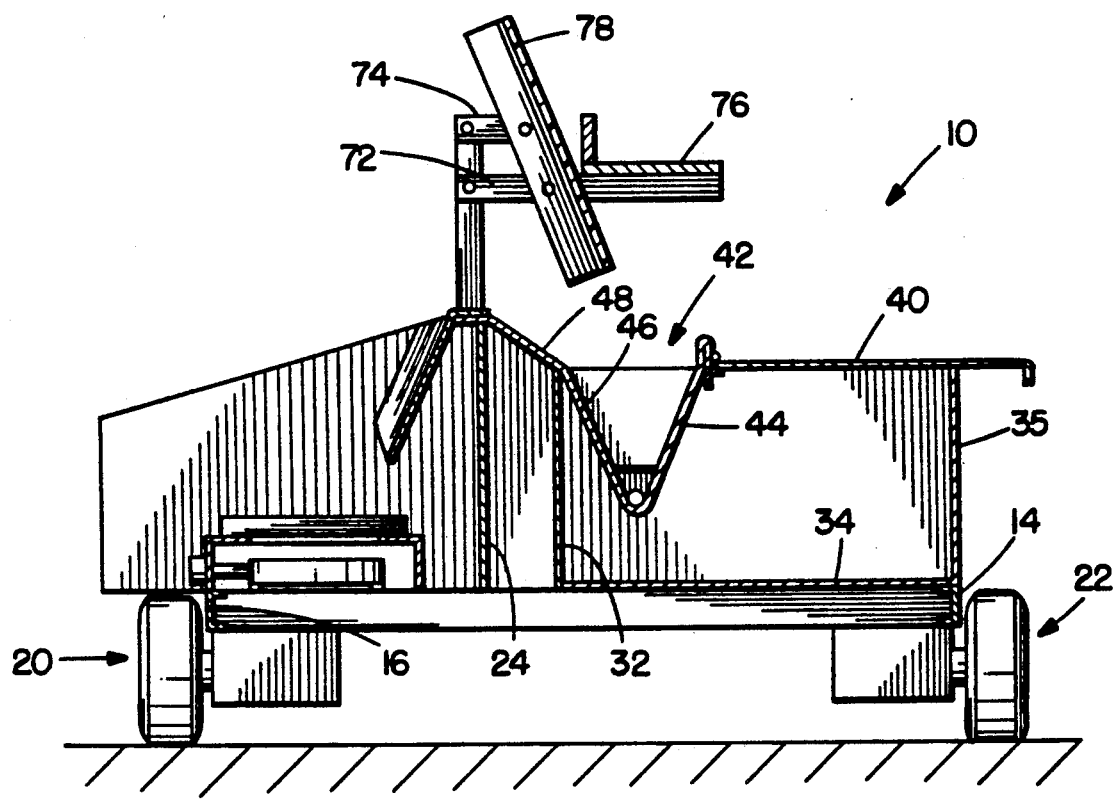
FIG. 5 is a section taken on the line 5—5 of FIG. 3.

Along the left side of the trailer is a line of cooking stations 26, 28 and 30. These are formed of a single elongated backing plate 24 as shown in FIG. 5 serving as the back of each of the stations which are separated from each other by dividers 54, 56 and 58. A plate 32 as seen in FIG. 5, extends the length of the trailer at about the midpoint thereof. The latter serves as the back of an elongated compartment for storage of materials the bottom of which is indicated at 34 and the front at 35. This elongated storage compartment has a plurality of hinged tops 36, 38 and 40 that permit convenient access to the storage area and which together form a serving table.

An elongated trough generally indicated at 42 extends the length of the trailer and protrudes downward into the above described storage area. It is seen that the trough 42 is v-shaped in cross section having a front 44, rear 46 and extension 48 that extends upward and over plate 24. Thus the trough is held in a firm position by plates 24 and 32.

Each of the cooking stations 26, 28 and 30 includes a stove that may be of the gas type that has two burners 50, 52 for heating pans (not shown) of oil that in turn are used for deep frying the individual pizzas. The vehicle has a front end plate 60 and a rear plate 62 which aid in supporting upstanding brackets 64, 66. Intermediate brackets 68 and 70 are in line with the forward and rear end brackets. Each of the brackets have horizontal members 72, 74 extending in the direction of the side of the vehicle on which the servers are located. The series of inline brackets 72 support a shelf 76 that may conveniently contain jars and cans of condiments for the pizzas. A windscreen 78 that may be made of a heat resistant plexiglass is also secured to the brackets 72, 74 and serves to provide a smoke screen to prevent smoke from blowing into the direction of the cooks who are generally standing in front of the cooking stations.

At the front end of the trailer there is provided a shelf 80 and a sink 82 constructed into the shelf for cleaning and washing. At the opposite end of the vehicle there are two cooking stations 84 each of which may be a dual stove station for cooking and heating the pizza sauce. These include the backplate 62 and sideplates 86, 88. The side plates have secured thereto a pair of jacks 90 so that when the trailer is in position the jacks may be extended to maintain it in a horizontal stable position. The forward end of the unit includes a bar 94 which carries a tow hitch (not shown) for coupling to a truck or automobile.

In operation it is understood that individual cooks will stand in front of each of the cooking stations 26, 28 and 30 on the left side of the trailer and serving persons will generally be positioned in front of the elongated table on the other side of the trailer. The cooks will control their individual stoves and deep fry the pizzas in the pans of oil. As the individual pizzas are cooked the cooks will place them in the trough 42 against the back surface 46 where they will be permitted to drain their oil which will drip into the bottom of the trough and be carried along to be discharged at one end thereof into an oil drip pan. The servers on the other side of the trailer will individually remove the cooked pizzas from the trough, place them on the elongated table and apply the condiments which are conveniently located on shelf 76. Thereafter the pizzas will be individually served to the customers.

Although three cooking stations are shown, it is understood that any convenient number can be provided. In one embodiment of the invention applicant constructed a unit of five cooking stations and a corresponding, longer serving table. A particular advantage of the design is that the cooks are located on one side of the unit and the serving personnel on the other. Each group of persons can conveniently perform their functions without interfering with the other.

The unit is entirely portable and may be towed to the desired location where it can be set up and connected to water and gas supplies. Equipment is conveniently carried in the storage compartment under the serving table with ready access by hinged doors 36, 38 and 40.

Having thus described the invention with particular reference to the preferred forms thereof, it will be obvious that various changes and modifications may be made therein without departing from the spirit and scope of the invention as defined in the appended claims.

What is claimed is:

1. A vehicle trailer portable food preparation apparatus comprising;
    a rectangular framework;
    wheel means secured to the underside of the rectangular framework to facilitate moving the trailer to desired locations;
    a line of a plurality of cooking stations secured to the framework and extending longitudinally on one side thereof;
    each cooking station including a plurality of stoves;
    a baffle plate separating each of the plurality of cooking stations and secured to the framework;
    an elongated table secured to the framework and extending longitudinally on the side thereof opposite the line of cooking stations;
    said elongated table being formed of a plurality of hinged plates;
    a storage compartment located under said tables and being accessed by said hinged plates;
    V-trough means extending the length of said trailer between the line of cooking stations and the elongated table means;
    and an elongated windshield separating the line of cooking stations from the elongated table.

2. The apparatus set forth in claim 1 including cooking means secured to one end of the framework.

3. A portable food preparation apparatus comprising:
    a framework;
    a plurality of wheels secured to the underside of the framework to facilitate transporting said apparatus to desired locations;
    a plurality of cooking stations arranged in a line on one side of the framework;
    each cooking station including a stove;
    elongated table means secured to the framework substantially parallel to the line of cooking stations for serving items of food;
    trough means separating the line of cooking stations and the elongated table means to receive food cooked at the cooking stations;
    and elongated windshield means extending longitudinally of the vehicle between the line of cooking stations and the elongated table means.

4. The apparatus set forth in claim 3 in which the elongated windshield is disposed at an acute angle from the vertical.

* * * * *